United States Patent
Lecointe

(10) Patent No.: US 11,440,036 B2
(45) Date of Patent: Sep. 13, 2022

(54) NOZZLE FOR SPRAYING LIQUID POLYMER PREPARATIONS AND SPRAYING METHOD UTILISING THE NOZZLE

(71) Applicant: SPCM SA, Andrezieux Boutheon (FR)

(72) Inventor: Charles Lecointe, Andrezieux Boutheon (FR)

(73) Assignee: SPCM SA, Andrezieux Boutheon (FR)

( * ) Notice: Subject to any disclaimer, the term of this patent is extended or adjusted under 35 U.S.C. 154(b) by 128 days.

(21) Appl. No.: 16/491,835

(22) PCT Filed: Mar. 20, 2018

(86) PCT No.: PCT/FR2018/050668
§ 371 (c)(1),
(2) Date: Sep. 6, 2019

(87) PCT Pub. No.: WO2018/172686
PCT Pub. Date: Sep. 27, 2018

(65) Prior Publication Data
US 2020/0376506 A1    Dec. 3, 2020

(30) Foreign Application Priority Data

Mar. 23, 2017 (FR) ...................................... 1752419

(51) Int. Cl.
*B05B 7/08* (2006.01)
*B05B 1/26* (2006.01)

(52) U.S. Cl.
CPC ............ *B05B 7/0846* (2013.01); *B05B 1/265* (2013.01); *B05B 1/267* (2013.01); *B05B 7/08* (2013.01); *B05B 7/0892* (2013.01)

(58) Field of Classification Search
CPC .......... B05B 1/26; B05B 1/262; B05B 1/265; B05B 1/267; B05B 7/0876; B05B 7/0884; B05B 7/0892

(Continued)

(56) References Cited

U.S. PATENT DOCUMENTS 3,237,870 A  *  3/1966  McCartney ............... B05B 7/02
                                              239/424
3,759,197 A      9/1973  Bracke
                 (Continued)

FOREIGN PATENT DOCUMENTS

FR    1357705 A    4/1964
FR    3009307 A1   2/2015
(Continued)

OTHER PUBLICATIONS

International Search Report (and English translation) and Written Opinion of the International Searching Authority for International Application No. PCT/FR2018/050668 dated Jun. 6, 2018.
(Continued)

*Primary Examiner* — Jason J Boeckmann
(74) *Attorney, Agent, or Firm* — Heslin Rothenberg Farley & Mesiti P.C.

(57) ABSTRACT

A method for spraying a mixture comprising at least a first liquid in the form of a liquid preparation of water-soluble or water-swellable polymers and at least a second liquid, characterized in that it implements a nozzle for simultaneously spraying at least two liquids, comprising: •a body provided with a first chamber within which a first liquid flows and a second chamber within which a second liquid flows, each of the two chambers having a through-hole on the outside of the body, •a deflector secured to the body arranged downstream from at least one of the through-holes, in the direction of flow of the first and second liquids, said deflector being capable of modifying the direction of flow of the first and second liquids. The invention also relates to a nozzle for implementing the method.

15 Claims, 2 Drawing Sheets

Figure 1:
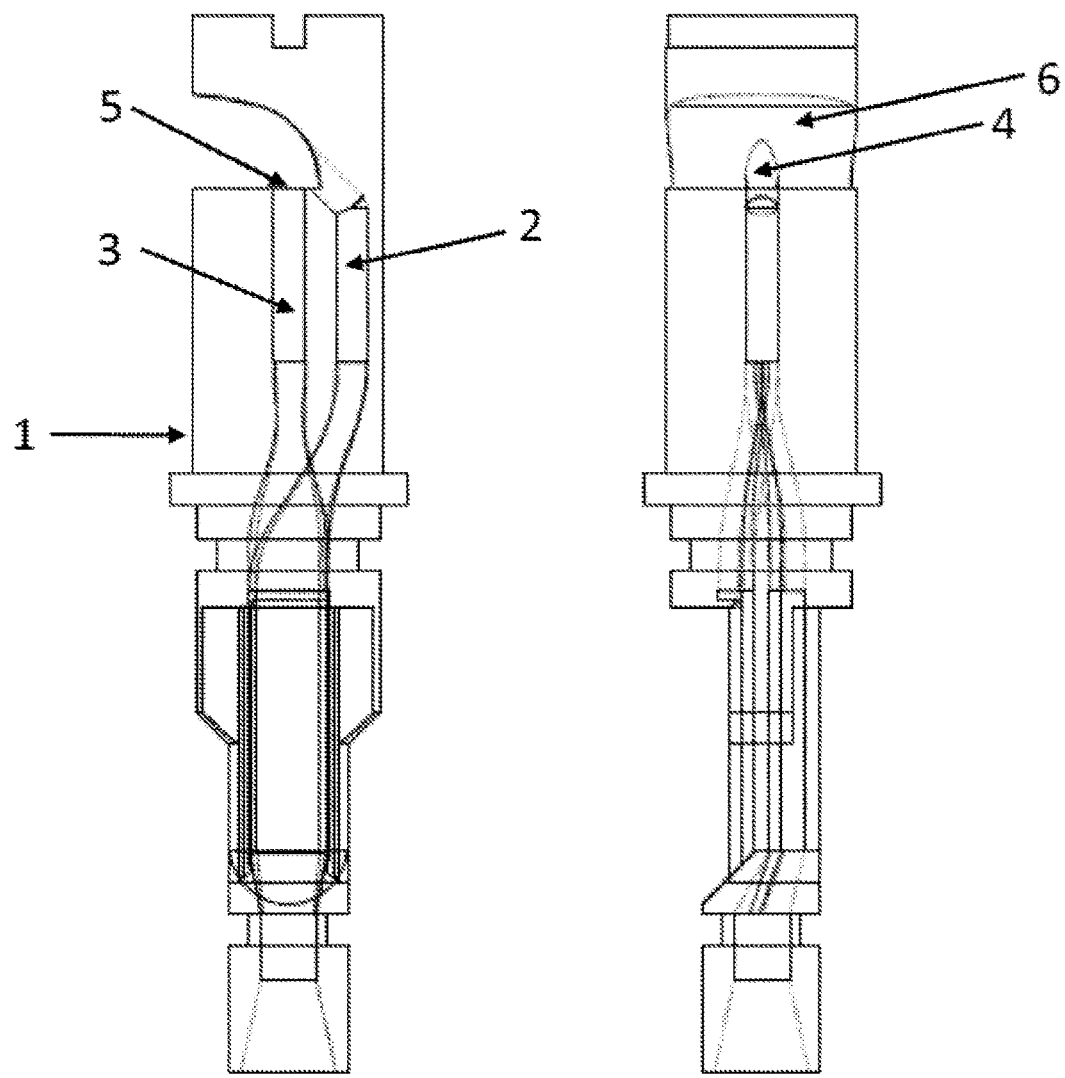
Figure 2:
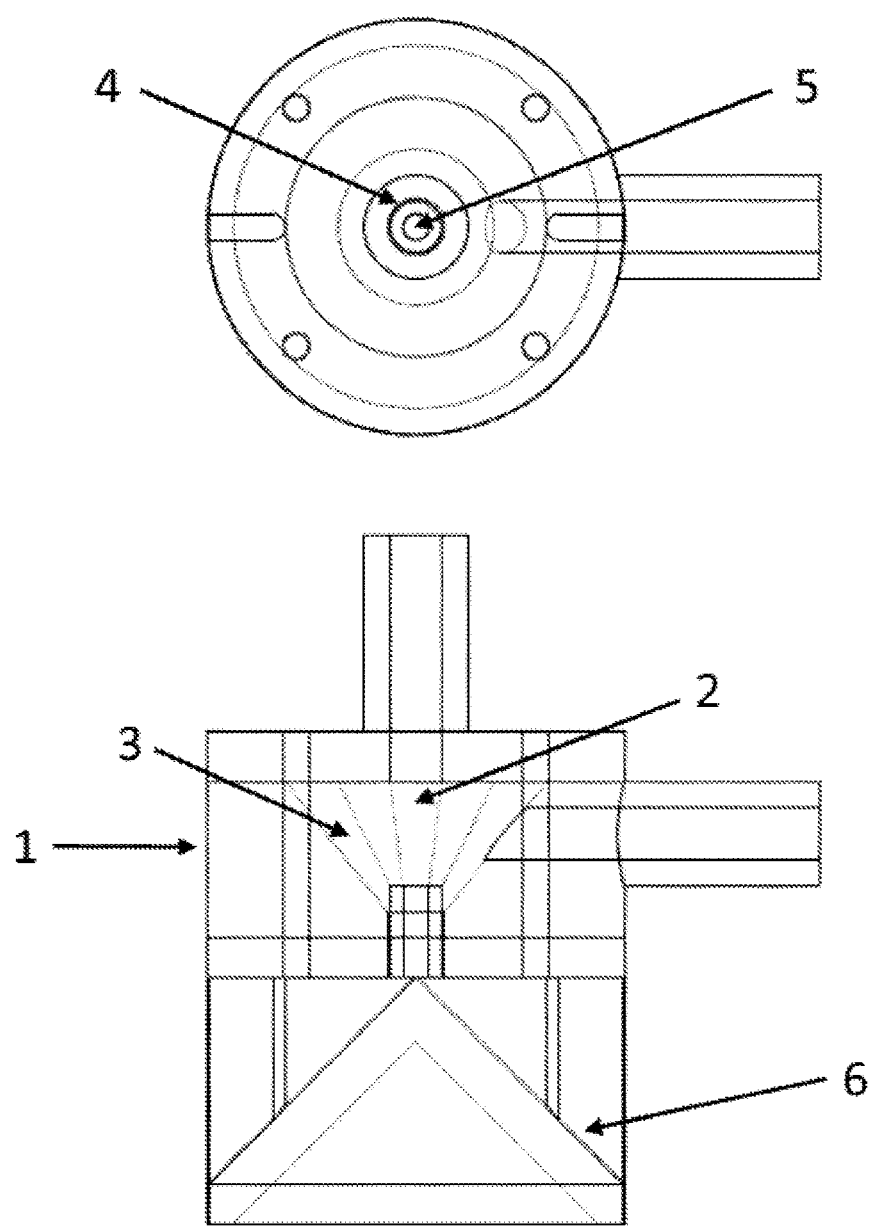

(58) Field of Classification Search
USPC .... 239/520, 523, 423, 424, 245, 433, 434.5, 239/549, 601, 416.4, 416.5
See application file for complete search history.

(56) References Cited

U.S. PATENT DOCUMENTS

| | | | |
|---|---|---|---|
| 3,759,857 A | | 9/1973 | Bracke |
| 3,875,697 A | * | 4/1975 | Bracke .................. C09K 17/48 47/9 |
| 4,361,285 A | * | 11/1982 | Koppehele ............. B05B 1/265 239/424 |
| 4,407,456 A | * | 10/1983 | Daniel .................... B05B 7/061 239/434.5 |
| 4,735,359 A | | 4/1988 | Demyanovich |
| 4,828,182 A | | 5/1989 | Haruch |
| 5,678,766 A | * | 10/1997 | Peck ..................... B05B 7/0018 239/419 |
| 5,992,529 A | * | 11/1999 | Williams ............... A62C 31/12 169/14 |
| 7,503,143 B2 | | 3/2009 | Krysiak et al. |
| 2006/0064844 A1 | | 3/2006 | Venard et al. |
| 2016/0120130 A1 | | 5/2016 | Whitwell et al. |

FOREIGN PATENT DOCUMENTS

| | | |
|---|---|---|
| JP | H1149805 A | 2/1999 |
| WO | 96/02126 A1 | 2/1996 |
| WO | 98/57531 A1 | 12/1998 |

OTHER PUBLICATIONS

Gabriels, D., et al., "Theoretical and practical approach for determining the optimal moisture content at the moment of soil conditioning", Mitteilgn. Dtsch. Bodenkundl. Gesellsch., vol. 15, pp. 185-203 (1972).

Kincaid, D. C., et al., "Spray patterns from fan-type nozzles for applying PAM to soil surfaces", Proc. Of Conf. 27, Seattle, WA, pp. 457-466 (1996).

Oliver, D. P., et al., "Minimising off-site movement of contaminants in furrow irrigation using polyacrylamide (PAM). I. Pesticides", Australian Journal of Soil Research, vol. 44, pp. 551-560 (2006).

"Conservation Practices Standard, Anionic Polyacrylamide (PAM) Application, (Ac.), Code 450" issued by the "Natural Resources Conservation Service" an agency of the USDA (2016).

* cited by examiner

NOZZLE FOR SPRAYING LIQUID POLYMER PREPARATIONS AND SPRAYING METHOD UTILISING THE NOZZLE

CROSS REFERENCE TO RELATED APPLICATIONS

This application is a national stage filing under section 371 of International Application No. PCT/FR2018/050668 filed on Mar. 20, 2018, and published on Sep. 27, 2018 as WO 2018/172686, which claims priority to French Application No. 1752419, filed on Mar. 23, 2017. The entire contents of WO 2018/172686 are hereby incorporated herein by reference.

The invention relates to a nozzle for spraying at least two liquids and more particularly liquid preparations of water-soluble or water-swellable polymers.

Water-soluble or water-swellable polymers, in particular including polyacrylamides are used for multiple agricultural applications such as to limit hydraulic and wind-based soil erosion, to control the slaking of soil in order to thus promote the germination and emergence of crops, without being limited to these interests alone.

The implementation of these polymers is currently performed essentially by means of irrigation water. A person skilled in the art can in fact refer as an example to the document titled "*Conservation Practices Standard, Anionic Polyacrylamide (PAM) Application, (Ac.), Code* 450" issued by the "*Natural Resources Conservation Service*" an agency of the USDA. Polyacrylamides can be added in powder or block form (document WO96002126) in order to surface irrigation water or in liquid preparation form within a pressurized system (document WO9857531).

Granted, some methods for spreading or spraying water-soluble or water-swellable polymers in solid form make it possible to eliminate the use of irrigation water as the application vector but they are restrictive. In effect, the spreading of polyacrylamides in powder form on agricultural soils involves specific formulations (U.S. Pat. No. 7,503,143) or specific materials (document US2016120130) in order to obtain a homogeneous distribution of the polymer on the ground.

Liquid spraying methods therefore remain preferred but several technical or economic difficulties remain to be overcome.

Spraying of Diluted Polyacrylamide Solutions

The colloidal nature of polyacrylamides with a high molecular weight (>10 million Da) in aqueous solution requires substantial dilution for spraying using standard agricultural nozzles. For example, according to Kincaid, D. C and Lentz, R. D. and Lehrsch, G. A (1996) *Spray patterns from fan-type nozzles for applying PAM to soil surfaces.* pp. 457-466. In: Proc. Of Conf. 27. Erosion control technology . . . bringing it home. USA-WA-Seattle, 1996 Feb. 27-Mar. 1. Int. Erosion Control Assoc., Steamboat Springs, Colo., the concentration thereof in aqueous solution must not exceed 900 ppm (0.9% by weight) for spraying using a common agricultural sprayer. Furthermore, the spraying pressure must be significantly increased in order to avoid coalescence of the jet. The necessary means to spray these aqueous polymer solutions (very substantial quantity of water) are therefore limiting. As an example, the application of 10 kg of polyacrylamide on a surface of 10,000 square meters (1 ha) at a concentration of aqueous solution of 1200 ppm causes the use of 8333 liters of water. Such a quantity of water per surface unit is equivalent to an irrigation (FR3009307) which is contrary to the desire to eliminate irrigation water as vector for the application of these polymers.

In this same document (Kincaid & al, 1996), the application of polyacrylamide at the concentration of 3000 ppm requires lowering the spray nozzles to 38 mm from the ground and doubling the number of nozzles due to problems with jet coalescence. In so doing, two spray nozzles make it possible to spray the polyacrylamide suspension only over a width of 20 to 30 mm. Such a method cannot be industrialized, since it involves applying a sufficient quantity of these polymers to an agricultural surface within a reasonable length of time.

Spraying Concentrated Polyacrylamide Solutions Using an Atomizer.

Document FR1357705 proposes to use specific equipment, in the case of hand rotary atomizers, to generate fine drops of uniform size from a concentrated liquid preparation of water-soluble or water-swellable polymers. This method which has demonstrated the effectiveness thereof does not need to dilute the polymer solution to be sprayed in large quantities of water. However, this method requires specific equipment, the cost or upkeep whereof can be a hindrance.

Spraying with Air Injection Nozzles

The person skilled in the art could spray concentrated liquid preparations of polyacrylamide as described in document FR1357705 using air injection nozzles (example nozzle: U.S. Pat. No. 4,828,182). But the small quantity of water contained within these liquid preparations would limit the efficacy of the polyacrylamides. Indeed, according to Gabriels and De Boodt *Theoretical and practical approach for determining the optimal moisture content at the moment of soil conditioning.* Mitt. Deutsch Bodenkund Gesel. 15, 185-203, moisture influences the efficacy of soil conditioners applied on agricultural soils. Furthermore, the quantity of compressed air and the pressure necessary to spray thick products through this type of equipment requires significant energy consumption that it is difficult to supply using an agricultural tractive unit or a self-propelled sprayer. Lastly, since a concentrated liquid preparation of polyacrylamide has a high content level of non-volatile solid materials, the compressed air flow would result in drying out the product during spraying, thus leading to the application of a pulverulent powder which moreover, by the adherence thereof, would stick to the walls of the nozzle ultimately clogging the narrow orifices thereof.

None of the aforementioned methods allows an easy application of a concentrated aqueous preparation of water-soluble or water-swelling polymers much less in mixture with other hard-to-mix (or even immiscible) substances and/or substances incompatible with the aqueous solution concentrated in polymer.

Even though the fact that adding polyacrylamides to irrigation water makes it possible to limit the leaching of certain herbicides (see Oliver & al *Minimising off-site movement of contaminants in furrow irrigation using polyacrylamide* (PAM) *I; Pesticides*, Australian Journal of soil Research 2006, 44, 551-560) is known, little information exists on the benefits of such a combination during the concomitant applications of polyacrylamide and the herbicide. Indeed, the two products are difficult to mix due to the viscosity but also the potential instability of the mixture.

The application of polyacrylamides in mixture with a cross-linking agent makes it possible to produce an in situ cross-linking reaction (U.S. Pat. Nos. 3,759,857, 3,875,697, 3,759,197).

This method is interesting, for example, to combat wind erosion. However, the mixture of polyacrylamides and cross-linking agents constitutes a reaction medium whose viscosity increases with the cross-linking process until obtaining a final cross-linked product which therefore has little or no solubility. Such a mixture is thus difficult to spray. Producing the mixture at the spray nozzle is an attractive solution. However, the cross-linking phenomenon using sodium hypochlorite for example is a fast reaction and caking of the reaction medium may occur in a static mixer positioned just downstream from the spray nozzle causing the obstruction thereof.

Document US 2006/064844 A1 describes a machine making it possible to clean the soils including a system making it possible to mix the soap on the one hand and water on the other hand. The system is provided with two chambers each having a through-hole whereof the axes are secant, combined with a deflector positioned downstream from one of the 2 through-holes.

In a field also different from that of spraying polymers, U.S. Pat. No. 4,361,285 A describes a nozzle for atomizing immiscible materials having two chambers wherein 2 liquids flow, which mix downstream from the outlet orifice of each of the chambers. The nozzle further comprises a third fluid made up of gas that is inserted between the deflector and the mixture of the 2 liquids.

In a field also different from that of spraying polymers, U.S. Pat. No. 4,735,359 A describes the combination of two nozzles positioned face to face, each of them being capable of spraying a single liquid. The two liquids mix after the trajectory has been modified beforehand by a deflector.

Therefore, in order to meet the requirement to spray solutions of water-soluble or water-swellable polymers, wherein the content by weight of polymer is advantageously between 0.01% and 75%, the Applicant has developed a nozzle, which additionally offers the possibility of mixing them during spraying with substances that are nevertheless incompatible. The simplicity of this nozzle makes it inexpensive and the use thereof causes low energy consumption.

The invention thus relates to a method for spraying a mixture comprising at least a first liquid in the form of a liquid preparation of water-soluble or water-swellable polymers wherein the content by weight of polymer is advantageously between 0.01% and 75% and at least a second liquid using a nozzle, the features whereof appear hereinafter.

The invention also relates to a nozzle as such for simultaneously spraying at least two liquids for the implementation of said method, the nozzle including:

- a body provided with a first chamber within which a first liquid flows and a second chamber within which a second liquid flows, each of the two chambers having a through-hole on the outside of the body,
- a deflector secured to the body arranged downstream from at least one of the through-holes, in the direction of flow of the first and second liquids, said deflector being capable of modifying the direction of flow of the first and second liquids, the holes being in practice positioned in relation to one another so as to allow the mixture of the first and second liquids at the latest after they have come into contact with the deflector, advantageously at the latest when they come into contact with the deflector.

According to a first feature, the axes of the through-holes of the two chambers making up the body are secant such that the first and second liquids mix before they come into contact with the deflector.

More preferably the axis of one of the holes is positioned in the longitudinal direction of the body.

In this specific embodiment, the deflector of the nozzle is positioned downstream from the hole whereof the axis is positioned in the longitudinal direction of the body.

According to another embodiment, the through-holes of the two chambers making up the body are positioned concentrically in relation to one another such that the first and second liquids mix at the latest after they come into contact with the deflector, advantageously at the latest when they come into contact with the deflector In this embodiment, the deflector of the nozzle advantageously assumes the form of a cone of revolution, the apex of which is oriented toward the through-holes and the axis whereof is combined with the axis of said holes.

For this embodiment, the distance between the apex of the cone and the center of the through-holes is advantageously less than 20 mm, more advantageously less than 10 mm and still more advantageously less than 4 mm.

As already stated, another aspect of the invention relates to a method for spraying a mixture, comprising at least a first liquid in the form of a liquid preparation of water-soluble or water-swellable polymers wherein the content by weight of polymer is between 0.01% and 75% and at least a second liquid, implementing the nozzle previously described. More preferably, the content by weight of polymer for the first liquid is between 5 and 60% and still more preferably between 10 and 50%.

Lastly, the invention also relates to the use of the nozzle previously described in order to spray at least one preparation of water-soluble or water-swellable polymers in the fields of agriculture, more particularly in order to limit soil erosion, rainwater and wastewater treatment, paper making methods and mining extraction.

In other words, the invention also relates to a method for spraying a mixture, comprising at least a first liquid in the form of a liquid preparation of water-soluble or water-swellable polymers and at least a second liquid, implementing the nozzle previously described, in the fields of agriculture, rainwater and wastewater treatment, paper making methods and mining extraction.

The invention and resulting benefits will become clear from the following examples, supported by the attached figures.

FIG. 1 describes a preferred embodiment of the nozzle according to the invention for which the body of the nozzle 1 comprises two chambers 2 and 3 opening onto holes 4 and 5, the axes whereof are secant with the deflector 6. The axis of the hole 4 is positioned in the longitudinal direction of the body 1 and the liquids that leave the holes 4 and 5 mix before they come into contact with the deflector 6, which is located downstream from the holes in the direction of flow.

FIG. 2 describes the nozzle according to the invention in a second preferred embodiment wherein the body of the nozzle 1 comprises two chambers 2 and 3, the through-holes 4 and 5 whereof are positioned concentrically in relation to one another. The deflector 6 is in the form of a cone of revolution, the apex whereof is oriented toward the through-holes 4 and 5 and the axis whereof is combined with the axis of said holes, such that the first and second liquids mix at the latest when they come into contact with the deflector.

The invention also relates to a method for spraying a mixture comprising at least a first liquid in the form of a liquid preparation of water-soluble or water-swellable polymers wherein the content by weight of polymer is preferably between 0.01% and 75% and at least a second liquid implementing the nozzle previously described. More preferably, the content by weight of polymer for the first liquid is between 5 and 60% and still more preferably between 10 and 50%.

By definition, a water-soluble polymer is a polymer that gives an aqueous solution without insoluble particles when it is dissolved with stirring at 25° C. and with a concentration of 50 g·L$^{-1}$ in water.

A water-swellable polymer is a polymer that swells and thickens the aqueous solution when it is placed in water at 25° C.

For the method according to the invention, the second liquid is aqueous or organic or a mixture of the two.

Still more preferably, the second liquid assumes the form of a water-in-oil emulsion or the form of an aqueous dispersion of particles.

According to one preferred embodiment, for the spraying method of the invention the second liquid contains at least one substance of agronomic interest or at least one substance making it possible to improve the development or growth of plant material, preferably a substance chosen from fertilizers, hormones, microorganisms, mycorrhizae, growth stimulators, growth regulators, phytosanitary products, for example fungicides, insecticides, plant protectors.

According to another preferred embodiment, for the spraying method according to the invention, at least a second liquid contains at least one cross-linking agent.

Still more preferably, the cross-linking agent is chosen from the group comprising alkali or alkaline earth metal hypochlorites or hypobromites, dialdehydes of formula O=CH—(R)$_n$—CH=O for which R is a saturated alkylene chain with 1 to 8 carbons and n=0 or 1.

Preferably, for the spraying method of the invention, the first liquid containing a water-soluble or water-swelling polymer, assumes the form of a homogeneous aqueous solution or a water-in-oil emulsion or a dispersion of polymer particles in aqueous phase.

For the water-in-oil emulsion, the water-soluble or water-swellable polymer is in droplets of water in suspension in the mobile phase that is the oil.

The dispersion of polymer particles in aqueous solution contains particles of at least one water-swellable or water-soluble polymer in suspension in an aqueous solution containing at least one compound chosen from a mineral salt, an organic salt, a dispersant organic polymer and mixtures thereof.

Preferably, for the spraying method of the invention at least one water-soluble or water-swellable polymer contained within at least a first liquid to be sprayed according to the method of the invention, is an acrylamide copolymer.

Advantageously, the comonomers of the acrylamide are non-ionic and/or anionic monomers.

The nonionic monomer or monomers can be chosen, in particular, from the group comprising water-soluble vinyl monomers. Preferred monomers belonging to this class are, for example methacrylamide, N-isopropylacrylamide, N,N-dimethylacrylamide and N-methylolacrylamide. It is also possible to use N-vinylformamide, N-vinyl acetamide, N-vinylpyridine and N-vinylpyrrolidone, acryloyl morpholine (ACMO) and diacetone acrylamide.

The anionic monomer or monomers can be chosen from acrylic acid, methacrylic acid, itaconic acid, maleic acid, 2-acrylamido-2-methylpropane sulfonic acid (ATBS), vinylsulfonic acid, vinylphosphonic acid, said anionic monomer being non-salified, partially salified or totally salified.

The last aspect of the invention relates to the use of the nozzle of the invention to spray at least one preparation of water-soluble or water-swellable polymers in the fields of agriculture, more particularly in order to limit soil erosion, rainwater and wastewater treatment, paper making methods and mining extraction.

In the field of agriculture and more specifically for soil erosion, the water-soluble or water-swellable polymer is advantageously sprayed concomitantly with at least a second liquid containing at least one substance of agronomic interest or at least one substance making it possible to improve the development or growth of a plant material.

The advantages of the nozzle of the invention, the spraying method using this nozzle and the use thereof have been illustrated in light of the following examples, but are not limited thereto.

EXAMPLE 1

Spraying of a Concentrated Mixture of Polyacrylamide with a High Molecular Weight According to the method of the invention concentrated mixtures of polyacrylamide with a high molecular weight were sprayed using a bi-liquid mirror nozzle equipped with two separate outlet holes.

This nozzle (corresponding to FIG. 1) was modeled in three dimensions then printed using an additive method from PET using an "Ultimaker 2+" printer. The total length of the nozzle is 67 mm, the diameter of the cross-section including the deflector is 12 mm, the diameter of the holes of the chambers is 2 mm and lastly the surface area of the deflector is 112 mm$^2$.

The nozzle was next equipped with the necessary gaskets before being introduced into a nozzle holder of the "Airjet Bi-Fluid" model of the Teejet brand. This nozzle holder is normally used for spraying with air injection. The use thereof has been adapted in order to allow for the conveyance of two liquids toward the nozzle previously drawn and printed.

Water was circulated in chamber 3 of the nozzle and various concentrated liquid preparations of polyacrylamides in chamber 2.

The polyacrylamides are copolymers of acrylamide and sodium acrylate (70/30, mol %) with a molecular weight of between 10 and 20 million Daltons.

The concentrated liquid preparations (25% by weight) used are described in the following table:

| Preparation | Formulation |
| --- | --- |
| A | Aqueous dispersion |
| B | Water in oil emulsion |

The flow rate of each liquid and the polymer concentrations of the mixtures thus sprayed are indicated in the following table:

| Trial | Preparation | Flow rate (L/min) | Water Flow rate (L/min). | Polymer concentration of the sprayed mixture (% by weight) |
| --- | --- | --- | --- | --- |
| 1 | A | 0.3 | 2.2 | 3 |
| 2 | B | 0.4 | 2.2 | 3.85 |

We obtain spraying in a homogeneous web over a width of more than 40 cm.

According to Kincaid & al (1996) the polymers used cannot be sprayed correctly at a concentration exceeding 900 ppm by weight (0.9% by weight). With the method of the invention, it was possible to spray the same polymers at a concentration more than times higher.

EXAMPLE 2

In Situ Cross-Linking of Polyacrylamide

A method for in situ cross-linking of polyacrylamide was implemented in order to stabilize a soil as described in the document "Crosslinking of acrylamide polymers" U.S. Pat. No. 3,759,857 but implementing the nozzle and the spraying method of the invention.

A liquid preparation of polyacrylamide (molecular weight around 100,000 Da) and a solution of sodium hypochlorite (cross-linking agent) were circulated in each of chambers 2 and 3 of the spray nozzle (identical to that of example 1).

The aim was for the two liquids to mix upon contact with the surface of the deflector (also called mirror) of the nozzle.

The table below summarizes the spraying parameters used:

| Chamber of the nozzle | Liquid (% by weight in water) | Flow rate (mL/min) | Concentration of the active ingredient within the sprayed mixture g/L) |
|---|---|---|---|
| 2 | Polyacrylamide 11.5% | 400 | 24.9 |
| 3 | Sodium hypochlorite 0.1% | 1450 | 0.8 |

Several nozzles were arranged on a spray bar in order to easily apply the mixture of the polymer and the cross-linking agent on the surface of tubs filled with a sandy soil. Once the mixture was applied, the cross-linking induces the formation of a stabilizing layer on the surface of the soil.

It should be noted that the spray nozzles are easily cleaned after spraying. No cross-linking and therefore no clogging occurred inside the spraying equipment.

The invention claimed is:

1. A method for spraying a mixture comprising at least a first liquid in the form of a liquid preparation of water-soluble or water-swellable polymers and at least a second liquid, wherein said method comprises implementing a nozzle for simultaneously spraying at least the first liquid and the second liquid, the nozzle including:

a body provided with a first chamber within which the first liquid flows and a second chamber within which the second liquid flows, each of the two chambers having a through-hole on the outside of the body, wherein the first chamber and the second chamber form a truncated cone shape having a tapered portion upstream of the through-holes, and wherein within the truncated cone shape, the first chamber and the second chamber are positioned concentrically in relation to one another, such that the first liquid and the second liquid flow concentrically relative to one another as they approach the through-holes, and a deflector secured to the body arranged downstream from at least one of the through-holes, in the direction of flow of the first and second liquids, said deflector being capable of modifying the direction of flow of the first and second liquids, wherein:

the through-holes are aligned on the same plane on the outside of the body and are positioned concentrically in relation to one another such that the first and second liquids mix at the latest when they come into contact with the deflector; and the deflector assumes the form of a cone of revolution wherein the apex thereof is oriented towards the through-holes and wherein the axis of the deflector is combined with the axis of said holes.

2. The method for spraying according to claim 1, wherein the axis of one of the through-holes is positioned in the longitudinal direction of the body.

3. The method for spraying according to claim 2, wherein the deflector is positioned downstream from the through-hole having the axis that is positioned in the longitudinal direction of the body.

4. The method for spraying according to claim 1, wherein the second liquid is aqueous or organic or a mixture of the two.

5. The method for spraying according to claim 1, wherein the second liquid assumes the form of a water in oil emulsion or the form of an aqueous dispersion of particles.

6. The method for spraying according to claim 1, wherein the second liquid contains at least one substance of agronomic interest or at least one substance making it possible to improve the development or the growth of plant material.

7. The method for spraying according to claim 1, wherein the second liquid contains at least one cross-linking agent.

8. The method for spraying according to claim 1, wherein the first liquid comprises an acrylamide copolymer.

9. The method for spraying according to claim 1, wherein the weight content of polymer in the first liquid is between 0.01% and 75%.

10. The method for spraying according to claim 1, wherein the method is implemented in a fields of agriculture.

11. The method for spraying according to claim 9, wherein the weight content of polymer in the first liquid is between 5 and 60%.

12. The method for spraying according to claim 9, wherein the weight content of polymer in the first liquid is between 10 and 50%.

13. The method for spraying according to claim 1, wherein the method is performed in order to limit soil erosion, treat rainwater or wastewater, as part of a paper making process, or during mining extraction.

14. The method for spraying according to claim 1, wherein:

the axes of the through-holes are secant such that the first and second liquids mix before they come into contact with the deflector; and/or the axis of one of the through-holes is positioned in the longitudinal direction of the body, and the deflector is positioned downstream from the hole having the axis that is positioned in the longitudinal direction of the body.

15. The method for spraying according to claim 1, wherein chambers present in the body consist of the first chamber and the second chamber.

* * * * *